US 8,826,467 B2

(12) United States Patent
Chew et al.

(10) Patent No.: US 8,826,467 B2
(45) Date of Patent: Sep. 9, 2014

(54) GLOVE WITH LIQUID STORAGE AND DISPENSATION CAPABILITIES

(75) Inventors: Sing Hoong Chew, Penang (MY); Hean Kooi Ong, Penang (MY)

(73) Assignee: Maxi Support SDN BHD, Penang (MY)

( * ) Notice: Subject to any disclaimer, the term of this patent is extended or adjusted under 35 U.S.C. 154(b) by 186 days.

(21) Appl. No.: 13/000,624

(22) PCT Filed: Jun. 25, 2009

(86) PCT No.: PCT/MY2009/000077
§ 371 (c)(1),
(2), (4) Date: Dec. 21, 2010

(87) PCT Pub. No.: WO2009/157752
PCT Pub. Date: Dec. 30, 2009

(65) Prior Publication Data
US 2011/0113528 A1    May 19, 2011

(30) Foreign Application Priority Data

Jun. 26, 2008  (MY) .................................. 20082330

(51) Int. Cl.
  *A41D 19/00* (2006.01)
  *A47L 13/19* (2006.01)
  *B32B 25/00* (2006.01)
  *A47K 7/03* (2006.01)
(52) U.S. Cl.
  CPC . *A47K 7/03* (2013.01); *A47L 13/19* (2013.01); *B32B 25/00* (2013.01)
  USPC .......................................................... 2/160

(58) Field of Classification Search
  CPC ........... A47K 7/03; A47L 13/19; A47L 13/18; B32B 25/00; A41D 19/01594; A46B 5/04
  USPC ............. 2/161.6, 160, 159, 167, 168; 15/227, 15/118, 244.3, 244.1, 244.4, 105, 114, 15/229.11, 229.13
  See application file for complete search history.

(56) References Cited

U.S. PATENT DOCUMENTS 2,722,706 A * 11/1955 Chopp ............................ 15/227
3,643,386 A *  2/1972 Grzyll .......................... 451/523
(Continued)

FOREIGN PATENT DOCUMENTS

CA      2466320     * 11/2005
DE    29811160 A1     8/1998
(Continued)

OTHER PUBLICATIONS

"Machine Translation of Description of DE 29811160".

*Primary Examiner* — Khoa Huynh
*Assistant Examiner* — Anna Kinsaul
(74) *Attorney, Agent, or Firm* — Preston Smirman; Smirman IP Law, PLLC

(57) ABSTRACT

A hand covering such as a glove that is adapted to absorb and store an amount of liquid within an adsorbent layer incorporated into the glove. The liquid can be easily dispensed by certain movements of the hand such as squeezing or grasping. The glove design allows another, external layer purpose-engineered for particular applications to be either permanently or detachably attached on the exterior of the glove. The rubber used is a composite containing 10-20% nitrile and the remaining 80-90% natural latex.

8 Claims, 3 Drawing Sheets

(56) References Cited

U.S. PATENT DOCUMENTS

| | | | |
|---|---|---|---|
| 4,593,427 A * | 6/1986 | Ortolivo | 15/227 |
| 4,788,733 A | 12/1988 | Lerner | |
| 5,373,712 A * | 12/1994 | Yamamoto et al. | 66/195 |
| 5,682,612 A | 11/1997 | Schwarz | |
| 5,956,770 A * | 9/1999 | Dennis | 2/160 |
| 2003/0229931 A1 * | 12/2003 | Smedi | 2/159 |
| 2004/0031119 A1 * | 2/2004 | McKay | 15/227 |
| 2006/0005338 A1 * | 1/2006 | Ashe et al. | 15/244.4 |
| 2007/0086828 A1 | 4/2007 | Stewart | |
| 2008/0078046 A1 | 4/2008 | Reed | |

FOREIGN PATENT DOCUMENTS

| | | |
|---|---|---|
| GB | 2113977 | 8/1983 |
| JP | 11197079 A | 7/1999 |
| WO | 2005070033 A | 8/2005 |

* cited by examiner

GLOVE WITH LIQUID STORAGE AND DISPENSATION CAPABILITIES

CROSS-REFERENCE TO RELATED APPLICATION

The instant application claims priority to Malaysian Parent Application No. PI20082330, filed Jun. 26, 2008, pending, and PCT International Application No. PCT/MY2009/000077, filed on Jun. 25, 2009, pending, the entire specifications of both of which are expressly incorporated herein by reference.

FIELD OF INVENTION

This invention relates to a glove with a layer capable of storing liquid for subsequent dispensation.

BACKGROUND OF INVENTION

Hand coverings or gloves with a base rubber layer and attached outer surface are used widely today in many different applications. The outer layer may be purpose-engineered specifically for a particular application. For example, a sponge outer layer can be used for various applications such as cleaning and washing. Similarly, different types of polyester can be used as the outer layer for various applications such as scouring, painting, and pet grooming. In some of these applications, it is desirable to store an amount of liquid within the glove for later dispensation. Examples of this include shampoo for bathing pets, paint for painting, detergent for washing, etc.

U.S. Pat. No. 2,722,706 discloses a sponge-tipped rubber glove to aid beauticians in applying chemical treatments. Sponge pads are carried on the fingertips of the gloves to hold the chemical being applied. British application GB 2,113,977 discloses a glove of resilient or fabric material which has the fingertips and palm of the glove covered with a sponge coating.

A primary objective of the present invention is to provide a glove able to absorb and retain an amount of liquid for subsequent dispensation.

Another objective of the present invention is to provide a glove adapted for easy dispensation of the stored liquid in an easy to use manner.

Yet another objective of the present invention is to provide a glove that will protect the skin of the user from any harsh or toxic components of liquid stored within the glove.

SUMMARY OF INVENTION

The present invention is a hand covering such as a glove that is adapted to absorb and store an amount of liquid within an absorbent layer incorporated into the glove. The liquid can be easily dispensed by certain movements of the hand such as squeezing or grasping. The glove design allows another, external layer purpose-engineered for particular applications to be either permanently or detachably attached on the exterior of the glove. The rubber used is a composite comprising 10-20% nitrile and the remaining 80-90% natural latex.

In one embodiment of the present invention the glove is adapted to absorb and retain liquid and comprises a base layer being fashioned for receiving a user's hand, a storage layer attached to the exterior of the base layer, the storage layer being absorbent and able to retain and subsequently dispense fluid, an attachment layer fixed to an outer side of the storage layer, the attachment layer adapted to be removably attachable on its outer side to the inner side of an application layer, said application layer located on the exterior of the attachment layer. The means for the application layer to be removably attachable to the application layer may include VELCRO™ (hook-and-loop fastener) or some other similar mechanism. The removably-attachability between the application layer and the attachment layer can provide interchangeability of different types of the application layer. These application layer can be of sponge, cloth, cotton, microfibre (new cloth), scouring materials or other fluids application materials.

In another embodiment of the present invention the glove is adapted to absorb and retain liquid and comprises a base layer being fashioned for receiving a user's hand, a storage layer attached to the exterior of the base layer, the storage layer being absorbent and able to retain and subsequently dispense fluid, and an application layer located on the exterior of the storage layer, and wherein the application layer is permanently attached to the storage layer.

BRIEF DESCRIPTION OF DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF INVENTION

It should be noted that the following detailed description is directed to a glove with interchangeable application layers and is not limited to any particular size, shape or configuration.

Figure 1:
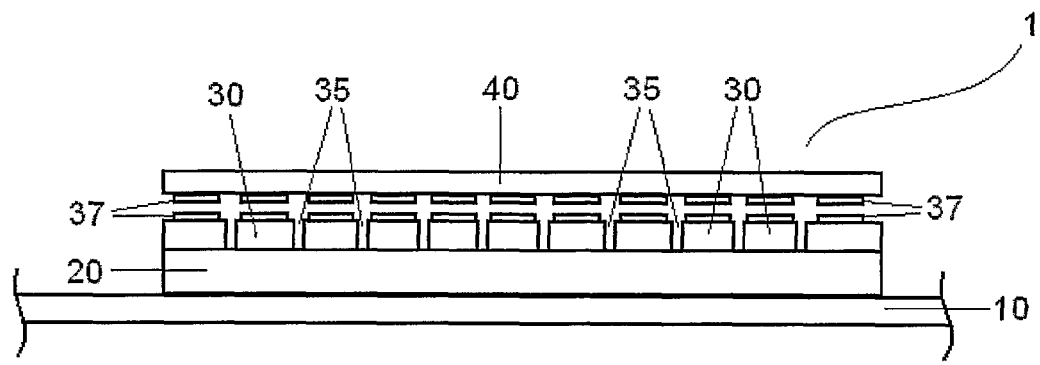
FIG. 1 shows a cross sectional view of the palm of the glove in a first embodiment of the present invention.

Referring to FIG. 1, there can be seen a cross section of the palm (1) of the glove in a first embodiment of the present invention. The innermost layer represented in the figure as the lowest layer is the base layer (10), made of a rubber composite comprising 10-20% nitrile with the remaining 80-90% being natural latex. However, there may be alternate embodiments wherein the base layer (10) is made from up to 100% natural rubber, and also embodiments wherein the base layer (10) is made from up to 100% synthetic rubber. This base layer (10) is adapted to fit snugly over a human hand and is watertight, thereby also providing a protective layer for the user from several types of liquids. At the palm (1) of the glove, there is fixed to the exterior of the base layer (10) a storage layer (20), the storage layer (20) being absorbent and able to retain and subsequently dispense fluid by simple movements of the user's hand. An attachment layer (30) is fixed to an outer side of the storage layer (20), the attachment layer (30) adapted to be removably attachable on its outer side to the inner side of an application layer (40), said application layer (40) located on the exterior of the attachment layer (30). The attachment layer (30) has openings (35) on and through its surface for fluid communication between the storage layer (20) and the application layer (40). In one embodiment of the present invention, the means for the application layer (40) to be removably attachable to the application attachment layer (30) is VELCRO™ (hook-and-loop fastener 37). Other removable mechanisms can also be used in different embodiments. The inner side of the application layer (40) is fitted with one half of the VELCRO™ (hook-and-loop fastener), and the outer side of the attachment layer (30) is fitted with the other half of the VELCRO™ (hook-and-loop fastener). The application layer (40) can function as any of a cleaner, scourer, surface preparation device or applicator for other liquids such as polishes and lacquers. As the application layer (40) is removably attachable to the attachment layer (30), the application layer (40) is therefore interchangeable. Different types of the application layer (40) include any of the following: sponge, cloth, cotton, microfibre (new cloth), scouring materials or other fluids application materials. In one embodiment of the present invention, the storage layer (20), attachment layer (30) and application layer (40) is provided only on the palm and fingers area of the glove. However, there can be other embodiments whereby these layers are located on different parts of the glove. The rest of the glove surface comprises only the base layer (10) and a protective layer (not shown) fixed to the exterior of the base layer (10).

Figure 2:
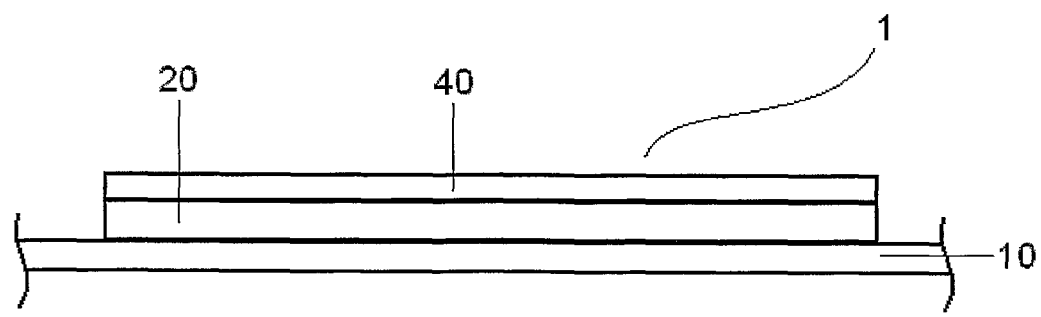
FIG. 2 shows a cross sectional view of the palm of the glove in a second embodiment of the present invention.

Referring now to FIG. 2, there can be seen a cross section of the palm (1) of the glove in a second embodiment of the present invention. The innermost layer of the glove represented in the figure as the lowest layer is the base layer (10), made of a rubber composite comprising 10-20% nitrile with the remaining 80-90% being natural latex. However, there may be alternate embodiments wherein the base layer (10) is made from up to 100% natural rubber, and also embodiments wherein the base layer (10) is made from up to 100% synthetic rubber. This base layer (10) is adapted to fit smugly over a human hand and is watertight, thereby also providing a protective layer for the user from several types of liquids. Fixed to the exterior of the base layer (10) is the storage layer (20), the storage layer (20) being absorbent and able to retain and subsequently dispense fluid by simple movements of the user's hand. An application layer (40) is fixed on the exterior of the storage layer (20). The application layer (40) can function as any of a cleaner, scourer, surface preparation device, or applicator for other liquids such as polishes and lacquers. The application layer (40) can be made from any of the following: sponge, cloth, cotton, microfibre (new cloth), scouring materials or other fluids application materials. In one embodiment of the present invention, the storage layer (20) and application layer (40) is provided only on the palm and fingers area of the glove. However, there can be other embodiments whereby these layers are located on different parts of the glove. The rest of the glove surface comprises only the base layer (10) and a protective layer (not shown) fixed to the exterior of the base layer (10).

Figure 3:
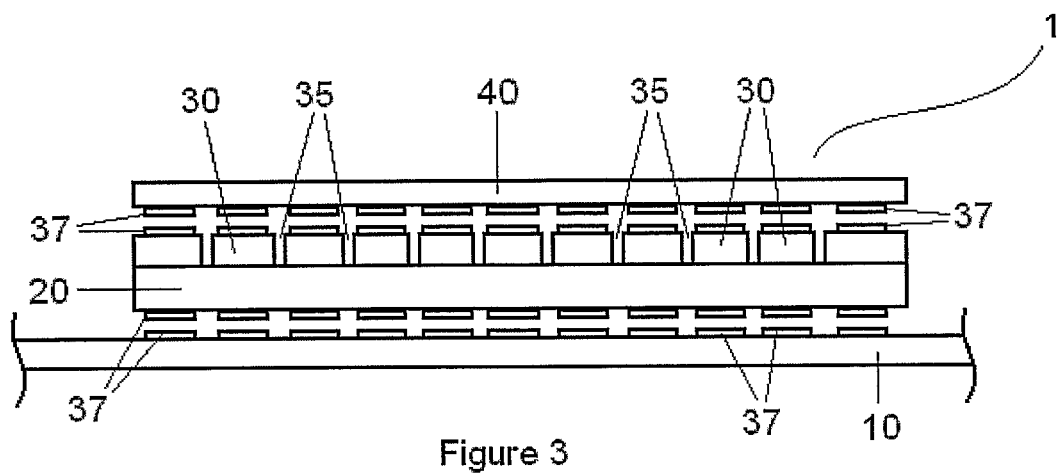
FIG. 3 shows a cross sectional view of the palm of the glove in a third embodiment of the present invention.

Referring to FIG. 3, there can be seen a cross section of the palm (1) of the glove in a third embodiment of the present invention. The innermost layer represented in the figure as the lowest layer is the base layer (10), made of a rubber composite comprising 10-20% nitrile with the remaining 80-90% being natural latex. However, there may be alternate embodiments wherein the base layer (10) is made from up to 100% natural rubber, and also embodiments wherein the base layer (10) is made from up to 100% synthetic rubber. This base layer (10) is adapted to fit smugly over a human hand and is watertight, thereby also providing a protective layer for the user from several types of liquids. At the palm (1) of the glove, there is removably attached on the exterior of the base layer (10) a storage layer (20), the storage layer (20) being absorbent and able to retain and subsequently dispense fluid by simple movements of the user's hand. An attachment layer (30) is fixed to an outer side of the storage layer (20), the attachment layer (30) adapted to be removably attachable on its outer side to the inner side of an application layer (40), said application layer (40) located on the exterior of the attachment layer (30). The attachment layer (30) has openings (35) on and through its surface for fluid communication between the storage layer (20) and the application layer (40). In one embodiment of the present invention, the means for the application layer (40) to be removably attachable to the attachment layer (30) is VELCRO™ (hook-and-loop fastener 37). Other removable mechanisms can also be used in different embodiments. The inner side of the application layer (40) is fitted with one half of the VELCRO™ (hook-and-loop fastener), and the outer side of the attachment layer (30) is fitted with the other half of the VELCRO™ (hook-and-loop fastener). The application layer (40) can function as any of a cleaner, scourer, surface preparation device or applicator for other liquids such as polishes and lacquers. The application layer (40) can be made from any of the following: sponge, cloth, cotton, microfibre (new cloth), scouring materials or other fluids application materials. As set forth in the preceding embodiment of the present invention, the removably attachable mechanisms between the base layer (10) and the storage layer (20), as well as between the attachment layer (30) and the application layer (40) allow the interchangeability of both the storage layer (20) as well as the application layer (40). In one embodiment of the present invention, the storage layer (20), attachment layer (30) and application layer (40) is provided only on the palm and fingers area of the glove. However, there can be other embodiments whereby these layers are located on different parts of the glove. The rest of the glove surface comprises only the base layer (10) and a protective layer (not shown) fixed to the exterior of the base layer (10).

Figure 4:
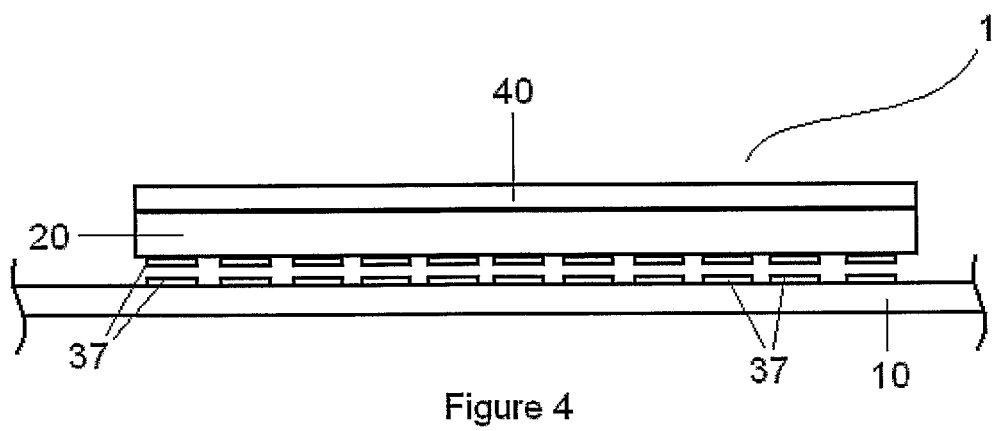
FIG. 4 shows a cross sectional view of the palm of the glove in a fourth embodiment of the present invention.

Referring to FIG. 4, there can be seen a cross section of the palm (1) of the glove in a fourth embodiment of the present invention. The innermost layer represented in the figure as the lowest layer is the base layer (10), made of a rubber composite comprising 10-20% nitrile with the remaining 80-90% being natural latex. However; there may be alternate embodiments wherein the base layer (10) is made from up to 100% natural rubber, and also embodiments wherein the base layer (10) is made from up to 100% synthetic rubber. This base layer (10) is adapted to fit smugly over a human hand and is watertight, thereby also providing a protective layer for the user from several types of liquids. At the palm (1) of the glove, there is removably attached on the exterior of the base layer (10) a storage layer (20), the storage layer (20) being absorbent and able to retain and subsequently dispense fluid by simple movements of the user's hand. An application layer (40) is fixed to an outer side of the storage layer (20). The application layer (40) can function as any of a cleaner, scourer, surface preparation device or applicator for other liquids such as polishes and lacquers. The application layer (40) can be made from any of the following: sponge, cloth, cotton, microfibre (new cloth), scouring materials or other fluids application materials. In one embodiment of the present invention, the storage layer (20), and application layer (40) is provided only on the palm and fingers area of the glove. However, there can be other embodiments whereby these layers are located on different parts of the glove. The rest of the glove surface comprises only the base layer (10) and a protective layer (not shown) fixed to the exterior of the base layer (10).

Figure 5:
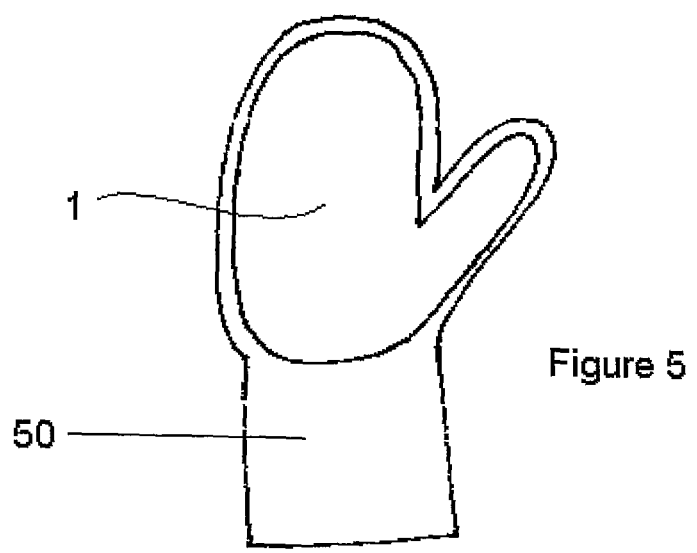
FIG. 5 shows a glove in an embodiment of the present invention.
Figure 6:
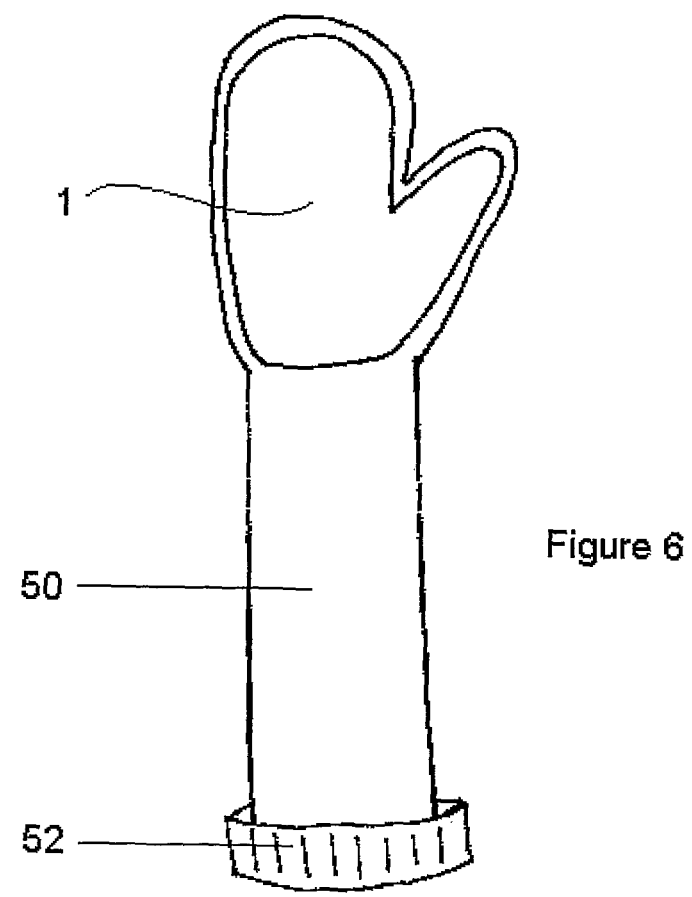
FIG. 6 shows a glove in another embodiment of the present invention.

Referring to FIGS. 5 and 6, the gloves of both the preceding embodiments can either have a sleeve (50) reaching just past the wrist as seen in FIG. 3, or with an extended sleeve (50) reaching almost to the elbow of user. Still referring to FIG. 6, an embodiment of this invention has a portion of the sleeve (50) at an end further from the glove folded back in an outwards direction creating a fold (52) in order to capture at least a minimum quantity of liquid flowing from the glove toward the sleeve (50). The width of the fold can be between 3 and 5 cm. This is especially useful when a user's hand is at a level higher than his/her elbow, to prevent liquid from reaching beyond the surface of the sleeve (50).

While several particularly preferred embodiments of the present invention have been described and illustrated, it should now be apparent to those skilled in the art that various changes and modifications can be made without departing from the spirit and scope of the invention. Accordingly, the following claims are intended to embrace such changes, modifications, and areas of application that are within the spirit and scope of this invention.

The invention claimed is:

1. A glove adapted to absorb and retain liquid, comprising:
   a base layer being fashioned for receiving a user's hand, the base layer comprising an inner side to fit over a user's hand and an exterior side opposite the inner side;
   a storage layer, the storage layer comprising an inner side attached to the exterior side of the base layer and an exterior side opposite the inner side, the storage layer being absorbent and able to retain and subsequently dispense fluid;
   wherein the storage layer comprises an attachment layer having an inner side and an exterior side opposite the inner side, wherein the inner side of the attachment layer is fixed to the exterior side of the storage layer, wherein the exterior side of the attachment layer is fitted with mechanisms adapted to provide removable attachment; and
   an application layer attached to the storage layer, the application layer having an inner side and an exterior side opposite the inner side, the inner side of the application layer fitted with mechanisms adapted to provide removable attachment;
   wherein the attachment layer forms a discontinuous surface on the storage layer and defines a plurality of row portions, wherein adjacent row portions of the attachment layer define openings such that the plurality of row openings alternates between rows of the attachment layer and rows of the openings;
   wherein the rows of the openings are continuous through a cross section of the plurality of row portions and the rows of the openings enable fluid communication between the storage layer and the application layer;
   wherein the mechanisms on the inner side of the application layer correspond to the mechanisms on the exterior side of the attachment layer to allow interchangeability of different types of the application layer.

2. The glove according to claim 1, wherein the mechanisms on the inner side of the application layer and the mechanisms on the exterior side of the attachment layer comprise a hook-and-loop fastener.

3. The glove according to claim 1, further comprising a sleeve of the glove with a length extending substantially beyond the wrist of a user.

4. The glove according to claim 3, wherein a portion of the sleeve at an end further from the glove is folded back in an outwards direction creating a fold such that at least a quantity of liquid flowing from the glove toward the sleeve is held in the fold.

5. The glove according to claim 4, wherein a width of the fold is between 3 and 5 cm.

6. The glove according to claim 1, wherein the storage layer is provided only around a palm and finger area of the glove.

7. The glove according to claim 1, wherein the base layer is made from up to 100% synthetic rubber.

8. The glove according to claim 7, wherein the synthetic rubber is nitrile.

* * * * *